April 6, 1965  J. J. PARKER ETAL  3,176,997
FIXTURE FOR SUPPORTING RING GEARS
Filed Jan. 8, 1962  2 Sheets-Sheet 1

INVENTORS
JOHN J. PARKER & LONDON T. MORAWSKI
BY
Barnes, Kisselle, Raisch & Choate
ATTORNEYS April 6, 1965   J. J. PARKER ETAL   3,176,997
FIXTURE FOR SUPPORTING RING GEARS Filed Jan. 8, 1962   2 Sheets-Sheet 2

INVENTORS
JOHN J. PARKER & LONDON T. MORAWSKI
BY
Barnes, Kisselle, Raisch & Choate
ATTORNEYS

United States Patent Office 3,176,997
Patented Apr. 6, 1965

3,176,997
FIXTURE FOR SUPPORTING RING GEARS
John J. Parker and London T. Morawski, both of
11487 E. Nine Mile Road, Detroit, Mich.
Filed Jan. 8, 1962, Ser. No. 164,925
11 Claims. (Cl. 279—1)

This invention relates to a work supporting fixture and more particularly to a fixture for supporting ring gears.

In machining and in checking ring gears, it is customary to support the ring gears about a support axis which is concentric to the pitch diameter of the teeth of the gear. Fixtures for supporting ring gears in this manner usually comprise a base plate of some form having projecting therefrom a plurality of pins or studs having ball-shaped ends which are adapted to engage between adjacent teeth of the gear at the pitch diameter.

One of the problems involved in the use of such supporting fixtures is that if the ball-pointed studs are accurately machined and located for a particular dimension, then the gear will be supported thereby in a proper position only if the teeth of the gear are likewise accurately formed. However, the tolerance dimensions of some ring gears are such that even though the gear teeth are within tolerance, the gear itself is not supported properly by the ball-pointed studs because the studs were ground and located for supporting a gear, the teeth of which were machined to much closer tolerances.

Another problem in the use of these pin plates for supporting ring gears is that the ball-shaped ends of the studs become worn and have to be replaced frequently.

It is an object of the present invention to provide a fixture for supporting ring gears for machining or for inspection purposes having teeth engaging, ball-pointed studs which are floatingly mounted on a fixed support so as to be capable of shifting slightly in a circumferential direction to thereby accommodate ring gears, the teeth of which may be dimensionally inaccurate but still within the tolerance specified for the ring gear.

A further object of the invention resides in the provision in ball-pointed, teeth engaging studs for a ring gear supporting fixture that can be progressively indexed about their axes in a self-indicating manner to visibly indicate to the user the portion of the ball-shaped end of the stud which is operative in any adjusted position of the stud to engage between the adjacent teeth of a ring gear supported thereon.

Figure 1:
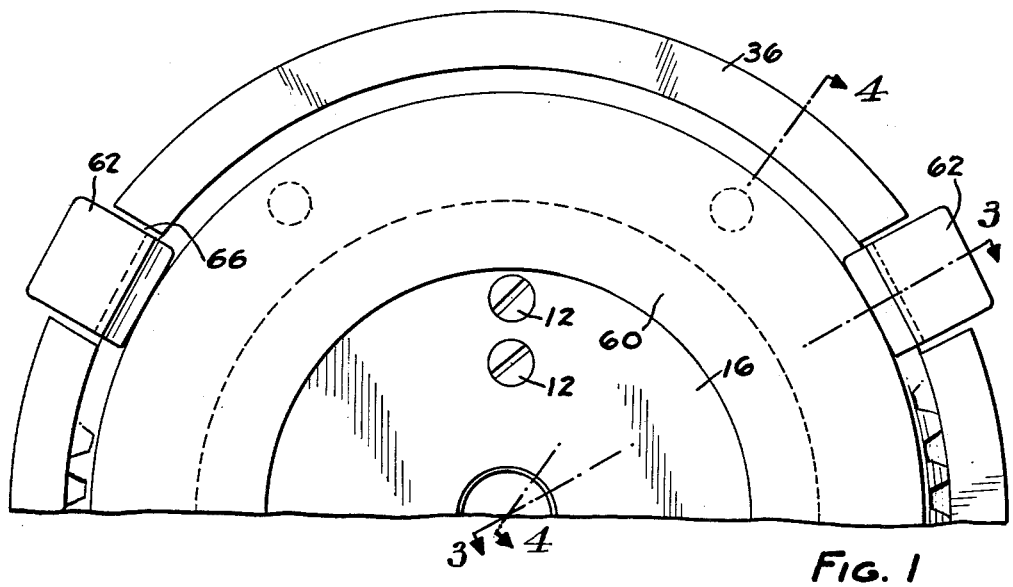
FIG. 1 is a fragmentary plan view of a ring gear supporting fixture embodying the present invention and having a ring gear mounted thereon.
Figure 2:
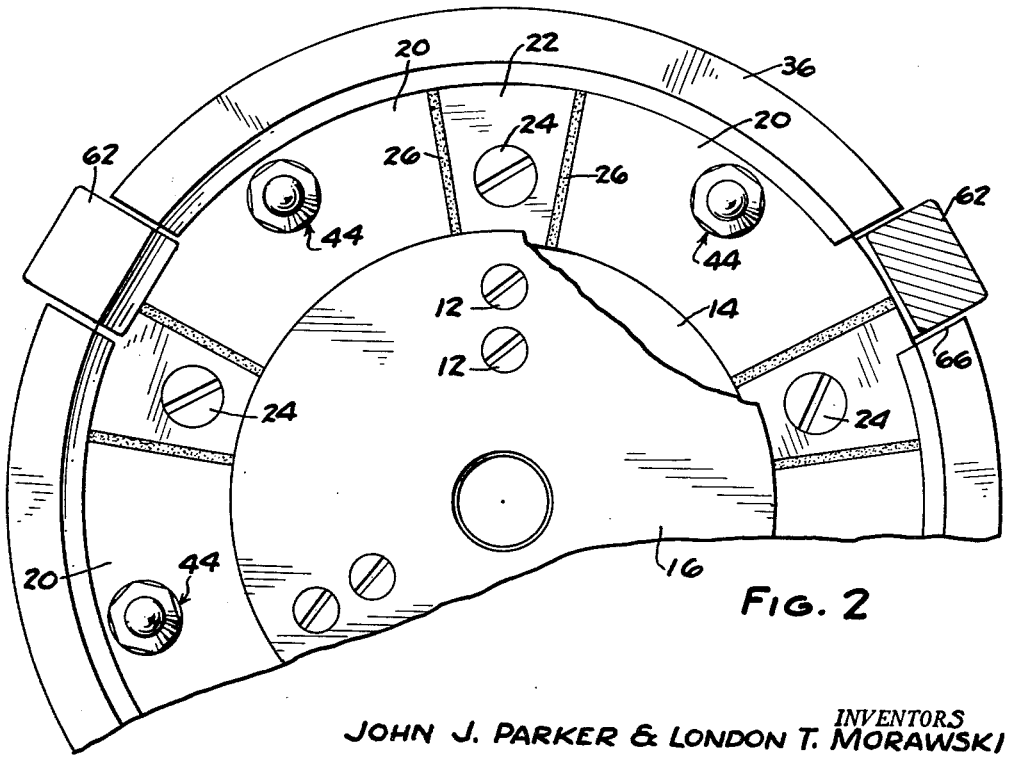
FIG. 2 is a top plan view of the ring gear supporting fixture with parts broken away and with other parts in section to better illustrate the construction thereof.
Figure 3:
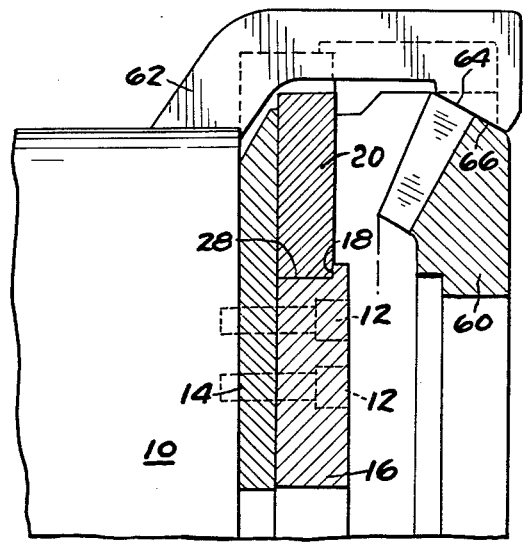
FIG. 3 is a sectional view along the line 3—3 in FIG. 1.
Figure 4:
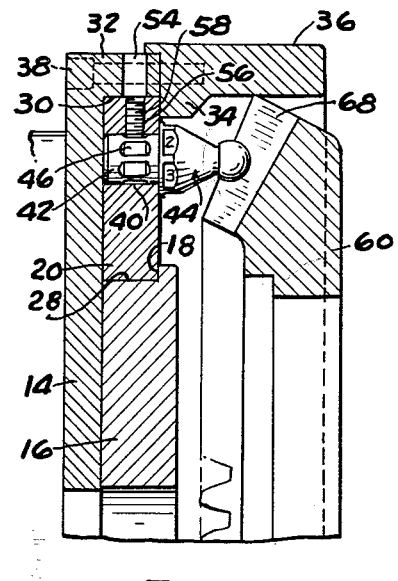
FIG. 4 is a sectional view along the line 4—4 in FIG. 1.
Figure 5:
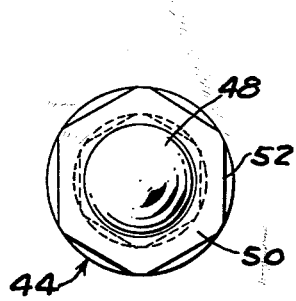
FIG. 5 is an end view of one of the ball-pointed studs used on the fixture.
Figure 6:
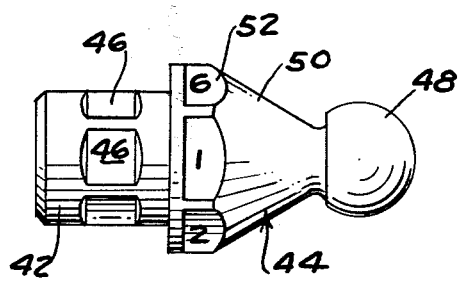
FIG. 6 is a side elevational view of the stud shown in FIG. 5.

The ring gear supporting fixture of the present invention includes a base 10 on which is secured as by screws 12 a base plate 14 and a ring 16. Around its outer periphery, ring 16 is fashioned with an undercut 18 for receiving the inner peripheral edges of a plurality of annular segments 20, 22. The segments 22 are secured to base plate 14 by means of screws 24. The adjacent ends of each pair of adjacent segments 20, 22 are spaced circumferentially apart as illustrated and these spaces are occupied by a compressible rubber insert 26. Thus, the segments 20 are radially confined on base plate 14 by the undercut outer edge 28 of ring 16 and the inner periphery 30 of the axially extending flange 32 around the outer edge of base plate 14 (FIG. 4). Segments 20 are axially confined on one side by base plate 14 and at the other side by the undercut 18 on ring 16 and by the annular heel 34 of the annular skirt 36 that is secured to the flange 32 of base plate 14 by screws 38. However, since the rubber inserts 26 are slightly compressible, segments 20 can be shifted slightly circumferentially relative to the fixed segments 24. The extent to which segments 20 can shift circumferentially depends upon the compressibility of the rubber inserts.

Each segment 20 is provided with an opening 40 for receiving the shank 42 of a stud 44. The cylindrical shank 42 of each stud has a plurality of flats 46 ground around the periphery thereof which serve as indexing means. The flats 46 are spaced uniformly around the shank of each stud. The opposite end of each stud is ball-shaped as at 48. The ball-shaped end 48 is connected with the shank portion 42 of the stud by a conical body portion 50. Adjacent the shank portion 42, the body portion 50 is fashioned with a plurality of flats 52 around the periphery thereof corresponding in number with the flats 46 on the shank 42. The flats are consecutively numbered as illustrated. Shank 42 of each stud has a close fit with the opening 40 in the segments 20. At points radially aligned with the openings 40 in segments 20, the axial flange on base plate 14 is provided with radially extending openings 54. The openings 54 are radially aligned with threaded openings 56 in segments 20 for receiving set screws 58. Set screws 58 are adapted to engage with one of the flats 46 on the shank portion 42 of the studs 44 to retain the studs in fixed adjusted positions in the openings 40 in segments 20.

In order to clamp the ring gear indicated at 60 on the fixture, the base 10 is provided with a plurality of articulated clamping jaws 62 having bevelled clamping faces 64 for engaging the bevelled outer periphery 66 of the gear. Suitable means not illustrated are provided for actuating jaws 62 to the clamped and work releasing positions. It will be observed that the flange 32 around the outer periphery of base plate 14 and the skirt 36 are notched as at 66 to accommodate the jaws 62.

In mounting a ring gear as shown at 60 on the fixture, the gear is arranged with the teeth 68 thereof facing the studs 44. The gear is positioned on the studs such that the ball-shaped ends 48 engage the adjacent faces of adjacent teeth 68 of the gear. The rubber inserts 26 are designed in thickness and resiliency such that if the gear teeth are within the tolerance specified, the studs 44 can shift slightly in a circumferential direction so that all the studs 44 will engage the gear teeth and hold the gear concentric with the pitch diameter thereof. It will be appreciated that if segments 20 were fixedly mounted on base plate 14 and some of the gear teeth were slightly inaccurately dimensioned but still within the tolerance specified for the gear, then the ring gear would not seat perfectly on the ball ends 48 of studs 44 and the gear might be located on the fixture in a slightly off-center position.

After substantial use, it is apparent that the ball-shaped ends 48 will have a tendency to wear slightly flat at the portions thereof which are repeatedly engaged by the faces of the gear teeth. After a predetermined amount of use, this wear problem can be remedied by simply loosening set screws 58 and rotating the studs 44 so that the screw 58 engages the next successive flat 46 on the shank 42 of the studs. It will be noted that since each flat 46 has a corresponding numbered flat 52 on an exposed portion of the stud, the adjustment of the studs 44 about their axes can by means of these indicia be successively progressive so that the user is aware at all times as to which portions of the ball-shaped ends 48 of the studs are operative. Thus, with new studs, they can all be positioned to the No. 1 position; and after a predetermined period of use, they can be all turned to the No. 2 position, etc. With the arrangement shown wherein the shank 42 has six flats 46 ground thereon, after the studs have been used for a predetermined period at the No. 6 position, the user knows that the studs should be replaced with a new set. Continued accuracy of the fixture over a very long period of time is thus assured.

We claim:

1. A stud for use on a fixture for supporting a ring gear having a shank portion at one end and a generally spherically shaped gear tooth engaging portion at its other end, said shank having a plurality of circumferentially spaced fixed indexing means around a periphery thereof, said indexing means being regularly spaced circumferentially.

2. A stud as called for in claim 1 including a plurality of different indicia means, one for each of said index means, fixed around a periphery of said stud, said indicia means being spaced axially from said index means toward said spherically shaped end of the stud.

3. A stud as called for in claim 1 wherein said index means comprises a series of flats around the shank of the stud.

4. A stud as called for in claim 3 wherein said indicia means comprises a series of successive numerals.

5. A fixture for supporting ring gears of the type wherein a ring gear is adapted to be clamped axially against a plurality of ball pointed studs mounted in circumferentially spaced relation on the base of the fixture characterized in that each stud has a supporting shank formed with a plurality of index means regularly spaced circumferentially around the periphery of the shank, the studs also having a plurality of different visible indicia means thereon, one for each of said index means and fixed relative to the index means, said indicia means being spaced axially from the supportig shank of the stud toward the ball pointed end of the stud, the fixture base having a plurality of sockets in which said shanks are received with a close fit and means associated with each socket for selectively engaging with each of the index means on the supporting shank of the studs for locating each stud in a predetermined position within its socket.

6. A fixture as called for in claim 5 wherein said indicia means are exposed for viewing when the stud shanks are received in said sockets.

7. A fixture as called for in claim 5 wherein said index means comprise a plurality of flats around the periphery of the stud shank.

8. A fixture as called for in claim 5 wherein said means for engaging the index means comprises a plurality of locking screws in the fixture base, one for each socket and radially disposed relative to the socket.

9. In a fixture for supporting ring gears of the type wherein a ring gear is adapted to be clamped axially against a plurality of studs mounted on a backing plate on the fixture, that improvement which comprises a plurality of arcuate segments forming a ring on the backing plate, said segments being separated from one another by relatively narrow radial slots, said slots having a resiliently elastic material therein, the alternate segments being fixed to the backing plate and the remaining segments being resiliently shiftable circumferentially on the backing plate through a small extent as permitted by the resiliently elastic material in the slots, each of the circumferentially shiftable segments having one of the ring gear supporting studs fixedly mounted thereon whereby when the ring gear is clamped axially against the studs, the studs are enabled to shift slightly circumferentially for solid interengagement with the teeth of the ring gear.

10. A supporting fixture as called for in claim 9 including means fixed on said backing plate for shiftably retaining said last mentioned segments on said backing plate.

11. A supporting fixture as called for in claim 9 including a circular disk on said backing plate having its outer peripheral edge engaging the inner peripheral edges of said shiftable segments, a ring on said backing plate having its inner peripheral edge engaging the outer peripheral edges of said shiftable segments, said disk and ring having portions thereof overlying the exposed face of said segments.

References Cited by the Examiner

UNITED STATES PATENTS

| 1,996,795 | 4/35 | Dodge | 184—105 |
| 2,877,022 | 3/59 | Parker et al. | |
| 2,933,320 | 4/60 | Lyons | 279—1.1 |
| 2,985,454 | 5/61 | Stoner. | |

FOREIGN PATENTS 186,947  9/56  Austria.

ROBERT C. RIORDON, *Primary Examiner.*

THOMAS J. HICKEY, *Examiner.*